(No Model.) 3 Sheets—Sheet 1.

M. B. BANOWETZ.
STALK CUTTER.

No. 443,349. Patented Dec. 23, 1890.

Witnesses:
E. P. Ellis,
J. M. Nesbit

Inventor:
M. B. Banowetz,
per
F. A. Lehmann,
atty.

THE NORRIS PETERS CO., PHOTO-LITHO., WASHINGTON, D. C.

(No Model.) M. B. BANOWETZ. 3 Sheets—Sheet 2.
STALK CUTTER.

No. 443,349. Patented Dec. 23, 1890.

Witnesses:
E. P. Ellis,
J. M. Nesbit.

Inventor:
M. B. Banowetz
per F. A. Lehmann,
atty.

(No Model.) 3 Sheets—Sheet 3.

M. B. BANOWETZ.
STALK CUTTER.

No. 443,349. Patented Dec. 23, 1890.

Witnesses:
E. P. Ellis,
J. M. Nesbit.

Inventor:
M. B. Banowetz,
per
F. A. Lehmann,
atty.

UNITED STATES PATENT OFFICE.

MATHIAS BARTHOLOMEW BANOWETZ, OF BROWN, ASSIGNOR OF ONE-HALF TO MONOHAN BROTHERS, OF CHARLOTTE, IOWA.

STALK-CUTTER.

SPECIFICATION forming part of Letters Patent No. 443,349, dated December 23, 1890.

Application filed August 27, 1889. Renewed October 9, 1890. Serial No. 367,469. (No model.)

*To all whom it may concern:*

Be it known that I, MATHIAS BARTHOLOMEW BANOWETZ, of Brown, in the county of Clinton and State of Iowa, have invented certain new and useful Improvements in Stalk-Cutters; and I do hereby declare the following to be a full, clear, and exact description of the invention, such as will enable others skilled in the art to which it pertains to make and use it, reference being had to the accompanying drawings, which form part of this specification.

My invention relates to an improvement in stalk-cutters; and it consists in the construction hereinafter described and claimed.

Figure 1:
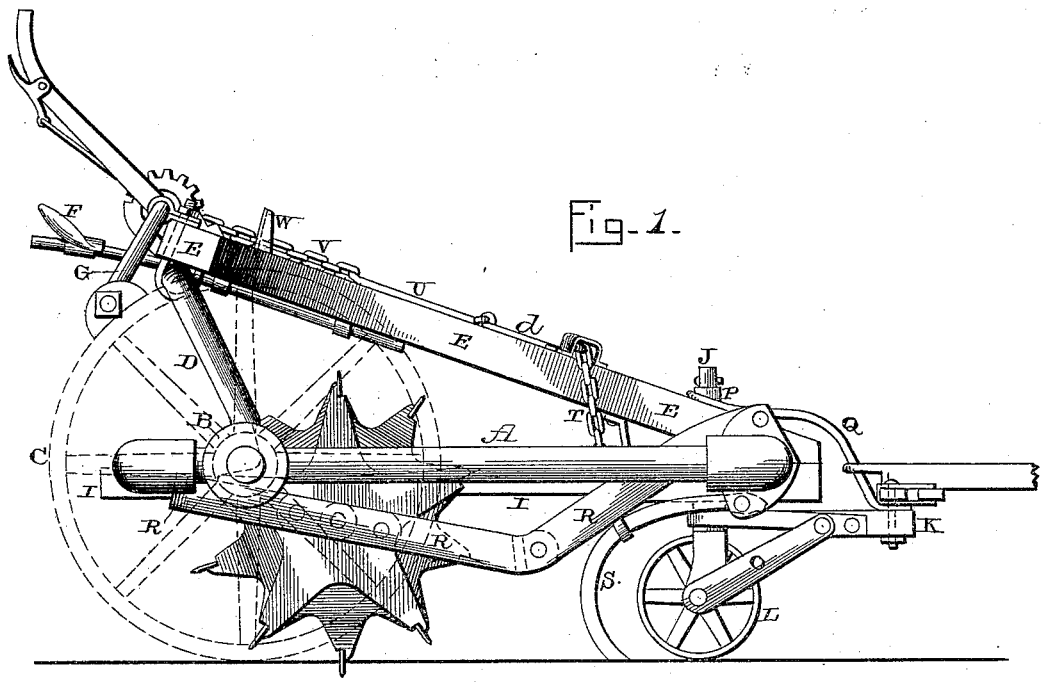
Figure 4:
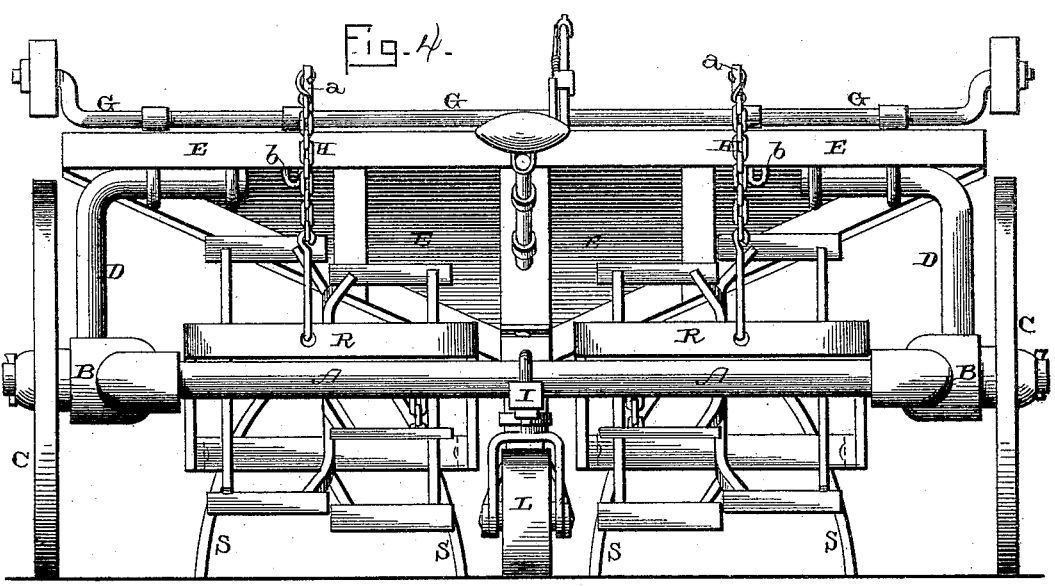
Figure 2:
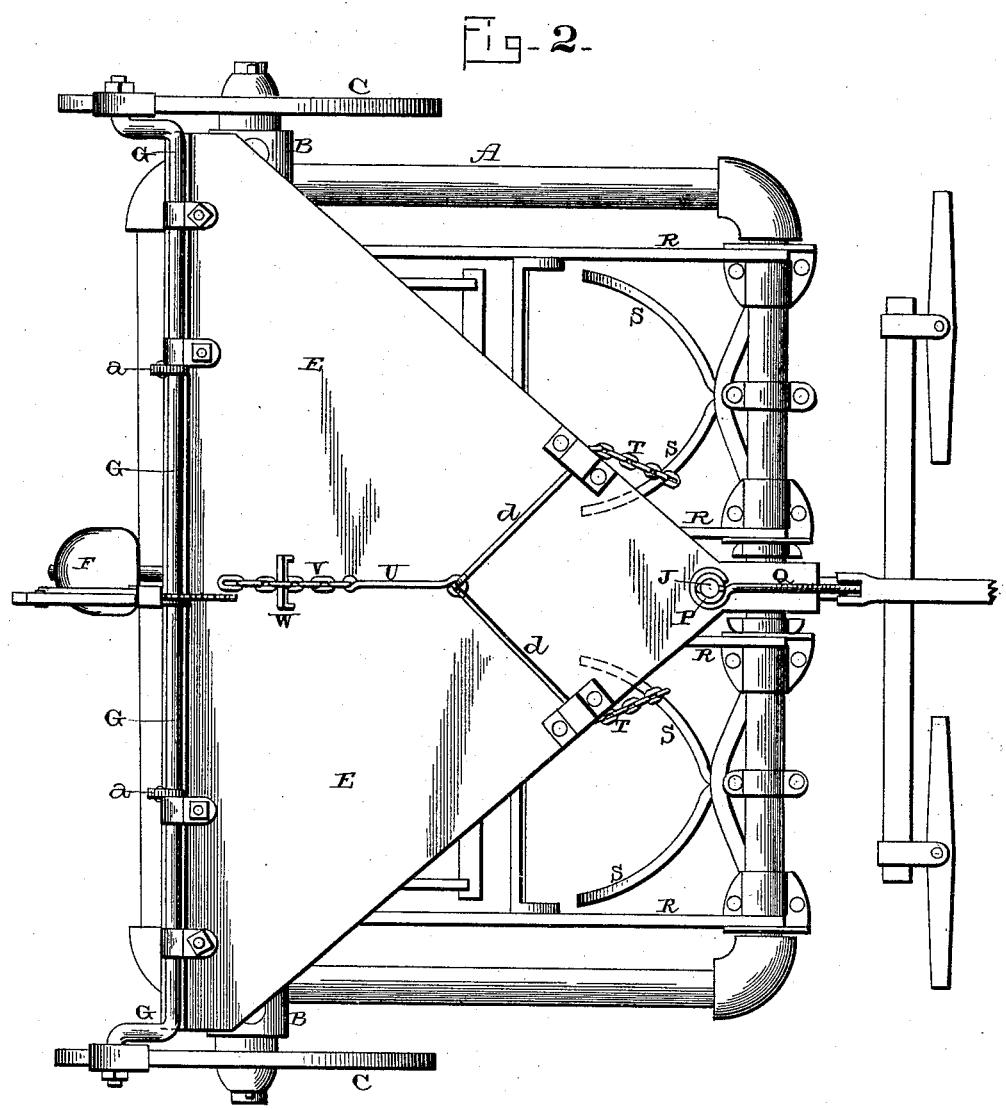
Figure 3:
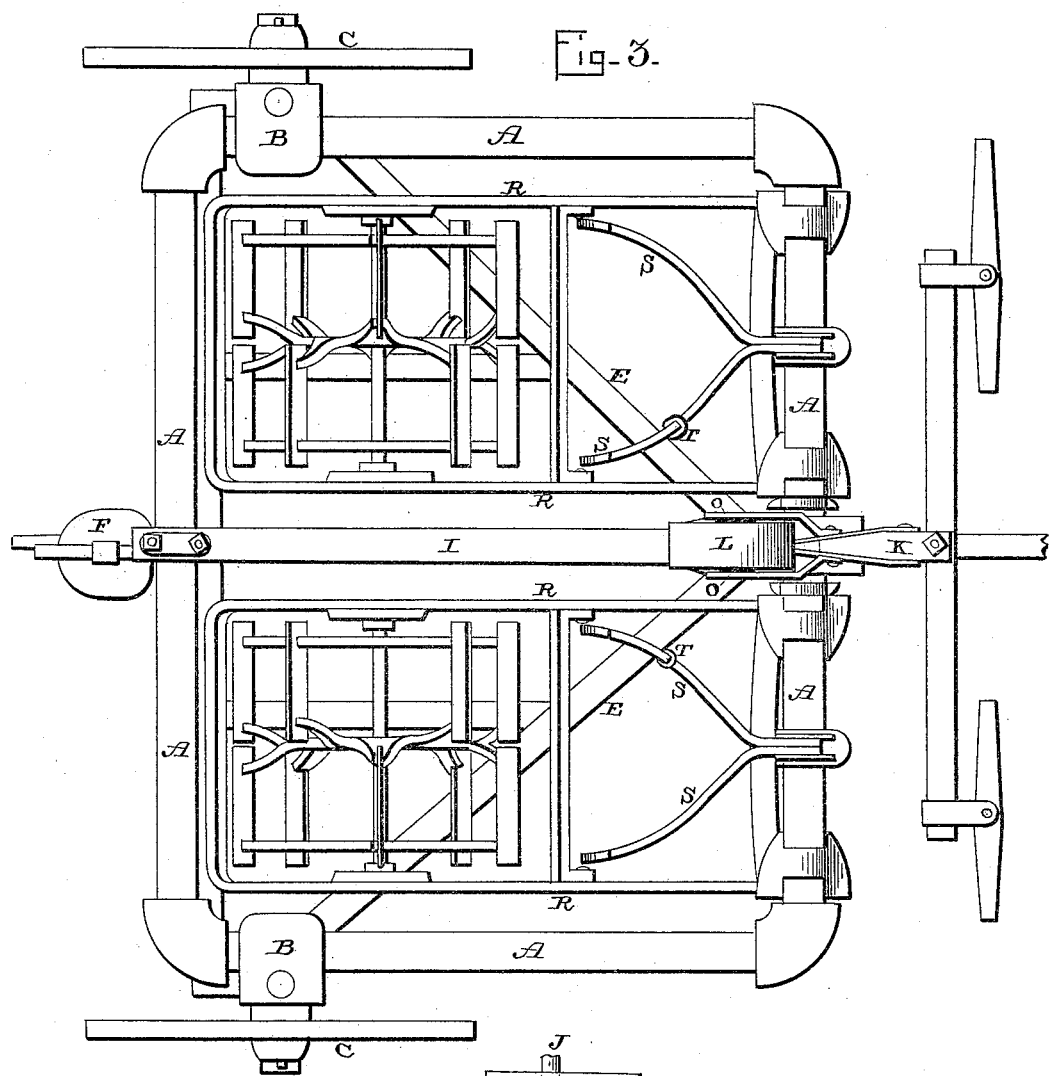
Figure 5:
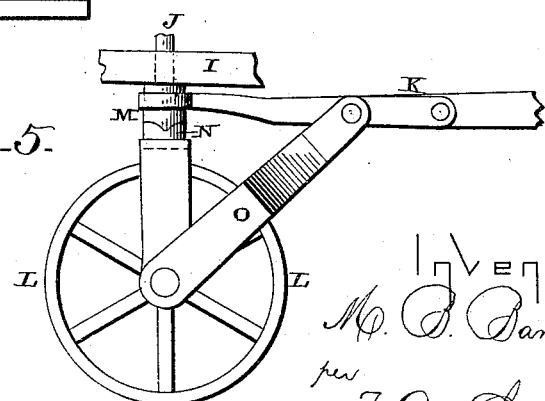

Figure 1 is a side elevation with the driving-wheel shown in dotted lines. Fig. 2 is a plan view. Fig. 3 is an inverted view. Fig. 4 is a rear view. Fig. 5 is an enlarged view of the two boxes M N.

A represents a horizontal rectangular metallic frame, which is preferably made of gas-pipe for the sake of lightness, strength, and durability, and upon which frame near its rear corners are placed boxes B, which are rigidly secured in position upon the frame, and from which projects the spindles upon which the wheels C are placed. Also projecting upwardly from these boxes B are the supports D, which have their lower ends secured in sockets formed therein, and upon the tops of which the rear corners of the platform E are secured. This platform E is preferably made triangular in shape, and it extends downwardly toward the front of the machine, where it is supported by its projecting front end upon the top of the frame A. This platform E serves as a support for the driver's seat F, which projects beyond its rear edge, and which seat can be adjusted back and forth, so as to cause the weight of the driver to counterbalance the front of the machine to any desired extent, and thus cause any desired weight to be thrown upon the front guiding-wheel.

Extending along the rear edge of the platform E is the partially-revolving shaft G, to which an operating-lever is applied at its center, where it will be most convenient to the driver, and which is provided with brake-blocks upon its ends. Also projecting from this shaft are short arms $a$, to which the chains H are attached when it is desired to raise and lower the cutter-frames. Each of these chains is provided with a hook at each of its ends, the lower one of which is always made to hook into the cutter-frame. When the frames are to be raised as the machine is moved back and forth from the field, the hooks upon the upper ends of the chains H will be hooked into the arms which project from the shaft. While the cutters are in use, the upper ends of these chains H will be hooked into rings or other supports $b$, attached to the under side of the rear edge of the platform.

Projecting across the central portion of the frame and serving as a brace is the cross-bar I, which has its front end secured to the frame and bolted or securely held against its under side by means of the same clamping-bolts which secure the front end of the platform E in position. This cross-bar I and the front end of the platform are braced together and serve as guides, boxes, or supports for the upper end of the spindle J of the guiding-wheel L, which supports the front end of the machine and serves to guide it. The spindle J extends upward through both the cross-bar and the front end of the platform, and in these two parts the spindle can be freely turned, according to the direction in which it is desired that the cutter shall move.

On the under side of the cross-bar I is formed a circular metallic bearing M, and upon the lower end of the spindle J is formed a circular bearing N. One of these bearings is made concave and the other convex, and these concave and convex parts are made to extend at a right angle to the movement of the machine, so that the spindle J will always have a tendency not only to remain in one position, but to return to this position, if moved. This position to which the spindle returns keeps the guiding-wheel straight to the front, so that the machine will always have a tendency to move straightforward and will only deviate from a straight line when the draft-animals turn positively either to the right or left. Pivoted upon these two bearing-surfaces M N is the draft-lever K, which has its front end to project any suitable distance beyond the front end of the cross-bar I, and which is provided with the braces O, which extend from it down to the journal of the guide-wheel L. These braces cause the guide-wheel L to follow the slightest movement of the lever K. Also extending from the top of this lever K back around a suitable casting, box, or bearing P upon the front end of the platform E is a brace-rod Q. To the front end of this lever K may be attached the tongue, which is made removable, and upon the top of the lever K is pivoted the doubletree, as shown. The whole draft of the machine is brought to bear upon this lever K, and the slightest movement of the horses either to right or left causes their motion to be at once transferred to the wheel L.

Pivoted to the front end of the frame A are the cutter-frames R, which have the cutters journaled therein near their ends. The cutters X X are composed of short blades, preferably about fourteen inches in length, with two sets of blades to each cutter, and the blades of one set arranged so as to be opposite the spaces between the blades of the other set, thus giving an effective cutting width of twenty-eight inches, but dividing this cutting width into two parts, which latter are in different right lines. There are several advantages arising from this alternate arrangement of the two sets of blades, some of which will now be mentioned. In the first place, the weight of the machine is concentrated on a short blade instead of being distributed upon a long blade at the time a stalk is being cut, and yet, inasmuch as there are two sets of blades, the effective width of the cutters is as great as if a long blade were used. Again, after a stalk is cut the blade usually enters the ground, but, being short, does not have such a wide bearing therein as a long blade would have and is more easily withdrawn, and thereby makes a lighter draft, and the comparatively narrow surface of the blade in the ground enables the corners to be readily turned. Further, it frequently happens that the stalks are not parallel with the cutters, but are out of line and are scattered in various directions away from the ridge of the row, and in such event a long blade would have to expend a large portion of its force in penetrating the ground at the top of the ridge before it reached the stalk; but according to my present invention one or other of the sets of the short blades would strike the stalk lying upon the side of the ridge and expend its force directly in cutting such stalk without penetrating the crest or the ridge of the row. The front ends of these frames R extend rearward and downward to a point in front of the cutters and below the journals thereof and then upward. These frames are shaped as shown for the purpose of forcing the cutters downward as the machine is drawn forward, and thus cause them to cut more effectively than they would do if the frames were made horizontal in the usual manner. Where the cutter-frames have their front and rear ends bent downward, so as to bring the point C of draft below the journals of the cutters, the cutting effect does not depend upon the weight of the cutters and their frames, as is the case where the point of draft is in a line with or above the journals of the cutters. By so shaping the frame as to bring the point of draft below the journals of the cutters they are continually forced downward upon the stalks as the machine is drawn forward, doing much better work and not requiring the cutters to be so sharp as where the weight of the cutters and their frame is alone depended upon for the cutting force. These frames are raised and lowered at their rear ends by the chains H, as already described.

Also pivoted by suitable followers to the front of the frame are the grapples S, to which the chains T are secured. These grapples serve to turn the stalks in such a position that the cutters will be enabled to cut them into pieces. The chains extend up over the top of the platform E and have the rods d attached to them, and these rods are connected together at their rear ends. To the rear ends of these rods is fastened a rod U, and to the rear end of this rod U is attached the chain V, which is extended back to the driver. Upon the top of the platform is placed a notched holding device W, in the upper edge of which the rod or chain catches, according to the position in which the grapples are to be held.

Having thus described my invention, I claim—

1. A stalk-cutter provided with two sets of cutting-blades, the blades of one set alternating in position with those of the other set, substantially as shown and described.

2. A stalk-cutter whose effective cutting width is composed of two sets of shorter blades, the blades of one set being opposite the spaces between the blades of the other set, substantially as and for the purpose set forth.

3. In a stalk-cutter, the combination, with the frame having a central cross-bar, supporting-wheels for its rear end, a platform supported above the said cross-bar, and cutters, of a vertical spindle which passes through the said platform and cross-bar which form journals therefor, a guiding and supporting wheel journaled in the lower end thereof, a draft bar or lever having its rear end connected to the spindle, braces secured at their lower ends to the journals of the said wheel and extending upward and forward and having their upper ends secured to the draft-bar, and a rod which is secured at its inner end to the guiding-wheel spindle above the platform and its outer end fastened to the front end of the draft-bar, and the doubletree and tongue secured to the draft-bar, all combined to operate in the manner shown and described.

4. In a stalk-cutter, the combination, with the main frame and supporting-wheels therefor, of the cutters journaled in the rear end of the cutter-frame, and the cutter-frame having its front end connected to the front end of the main frame and bent downward between its ends below and in front of the journals of the cutters and then upward to the cutter-journals, whereby the point of draft upon the said frame is below the cutter-journals, for the purpose described, substantially as shown.

In testimony whereof I affix my signature in presence of two witnesses.

MATHIAS BARTHOLOMEW BANOWETZ.

Witnesses:
JOHN PROOST,
R. M. ESSICK.